Patented Feb. 28, 1950

2,499,002

UNITED STATES PATENT OFFICE 2,499,002

EMULSIFIER AND METHOD OF MAKING SAME

Thomas Robinson, New York, and Carlton H. Bascom, Richmond, N. Y., assignors to Lancaster Processes, Inc., New York, N. Y., a corporation of New York No Drawing. Application July 23, 1946,
Serial No. 685,778

12 Claims. (Cl. 252—358)

This invention relates to stable emulsions of water with liquid or liquefiable substances which are immiscible with water, and to preparations comprising the same, and to methods of making the said emulsions and preparations. The said emulsions, or the said preparations comprising the same, are suitable for a great variety of purposes.

Stable emulsions according to the present invention comprise water, a liquid immiscible with water and a treated clay, as hereinafter defined, as the emulsifying agent.

Hitherto bentonite, clays and various finely powdered materials have been used for the manufacture of emulsions. These form emulsions having some desirable characteristics but all of these emulsions have serious drawbacks inasmuch as films from such emulsions are not sufficiently impervious to the action of water, showing to a greater or lesser extent a tendency to reemulsify after being immersed for any length of time in water. Also the bond between films and supporting base in most cases is destroyed by soaking, and often even by exposure to highly moist atmosphere.

It is the object of this invention to provide an emulsifying agent which will give emulsions with liquefiable substances, inter alia, asphalt, tar, coal tar pitch and synthetic resins which will be completely resistant to the adverse effects of water and its tendency to destroy the bond and to re-emulsify.

The emulsifier of the invention is specially prepared by treating a clay to produce a highly plastic, gelatinous material especially active as an emulsifying agent, yet one which on drying out can no longer be dispersed in water. A further desirable characteristic is that the emulsifier is virtually insoluble in acids. This is important in the emulsification of oils, especially those which are acidic in character.

In the preparation of this emulsifier, a clay is dispersed in water, for example, by being boiled with the water in the presence of a small amount of caustic soda, or other alkaline material to effect proper and quick dispersion. The dispersion is diluted with water, with or without the addition of alkali carbonates, and ammonia. This mixture is then added to a boiling solution of a water soluble aluminum salt such as aluminum sulphate, sufficient of the alkaline materials being present to completely precipitate the alumina as a hydrated gelatinous precipitate. Additional ammonia may be added as a dilute solution until sufficient is present to give a faintly ammoniacal odor. Large excess should be avoided for best results. After precipitation of the alumina the slurry is filtered and thoroughly washed.

For example, six parts by weight of clay, are mixed with fifteen parts of water containing 0.2 part of caustic soda. The mix is heated with occasional stirring to 210° F., and maintained at this temperature for one half hour. Eighty parts additional water is added and then twenty-two parts of concentrated ammonia (26° Bé.). A solution of thirty-two parts commercial aluminum sulphate in eighty parts water is heated to boiling and then the above clay slurry added slowly enough so as not to stop the boiling. The last of the addition leaves a faintly ammoniacal odor. Heating sufficient to maintain the slurry substantially at boiling is continued for an hour, after which the slurry is filtered and washed thoroughly until free from dissolved electrolytes. The pH of washed residue is approximately 5.8.

Other water soluble aluminum salts, such as alum, aluminum chloride, etc., may be used to produce suitable emulsifiers and the ratio of clay to alumina may be varied, some clays yielding satisfactory emulsifiers at much lower concentrations than others. The proportion of clay to hydrated aluminum oxide may be varied over wide limits, the maximum ratio of clay to hydrated aluminum oxide depending upon the type of clay used. In general lesser amounts of more highly colloidal clays should be used for best results. Black clay and china clay have been found to be particularly satisfactory.

The proportion of emulsifier used should, in general, be between 0.5–4.0% (calculated dry weight) based on the weight of oil or other water immiscible liquid being dispersed.

The normal procedure, when making an emulsion according to the present invention, is to take the required amount of emulsifier as prepared and dilute by mixing with suitable volume of water to form a mobile suspension, which may contain as much as 99.5% water. The liquid is then mixed with said suspension and the mixture agitated to form an emulsion. Homogenizers, colloid mills, etc., may be employed to obtain very fine dispersions, but the dispersions whether very fine or comparatively coarse will be found to be stable. Temperature of the components may be elevated when necessary. Emulsions may be diluted and are not sensitive to electrolytes in the water. When emulsions of low water content are required the emulsifier, according to the invention, may be used as prepared, with introduction of as little water as may be desired. With certain liquefiable materials it may be advantageous to have the materials relatively cool and emulsify under conditions such that there is a minimum of water present, sufficient water being added to the mix during the addition of the material being emulsified to maintain the proper plasticity of the mix.

Excess of the emulsifier may be used for special purposes such as stiffening the emulsion, filling the dried emulsion film, or others.

The following is an example of a waterproofing, or bonding emulsion made according to the present invention.

10% to 20% of the emulsifier shown above is warmed to 130° to 140° F., and to this emulsifier there is added 45% to 65% of 130–140 penetration, Venezuelan residual asphalt at 200° to 220° F., and 15%–40% water containing a small amount of ammonia. The ingredients are incorporated in a suitable mixer and on continued mixing a very finely dispersed emulsion is obtained. After emulsification, aluminum sulphate solution, ferrous sulphate solution, or solutions of other acidic materials may be added to the lower pH of the emulsion, but this may not be required.

Linseed oil, lubricating oils, petroleum waxes, coal tar pitches and other liquids or liquefiable substances may be emulsified for such purposes as paints, coatings, cements, disinfectants, etc. The example is given indicating how the emulsions are prepared but in no way limiting the scope of the invention.

What we claim and desire to secure by Letters Patent is:

1. A method of making an emulsifying agent, which comprises preparing an alkaline dispersion of clay in water and adding said dispersion to a boiling solution of an aluminum salt in the presence of sufficient alkaline material to precipitate the aluminum as a hydrated gelatinous precipitate.

2. A method of making an emulsifying agent, which comprises preparing an alkaline dispersion of clay in water, adding said dispersion to a boiling solution of an aluminum salt in the presence of sufficient alkaline material to precipitate the aluminum as a hydrated gelatinous precipitate, and filtering and thoroughly washing the resulting slurry.

3. A method of making an emulsifying agent, which comprises preparing an alkaline dispersion of clay in water containing ammonia, mixing said dispersion with a solution of an aluminum salt, and precipitating substantially all the aluminum under alkaline conditions at approximately boiling temperature with formation of a gelatinous, plastic precipitate of clay and hydrated alumina which has emulsifying activity and loses said activity on drying.

4. A method of making an emulsifying agent, which comprises preparing an alkaline dispersion of clay in water and adding said dispersion to a boiling solution containing an aluminum salt in an amount greater than the amount of clay in the presence of sufficient alkaline material to precipitate the aluminum as a hydrated gelatinous precipitate.

5. A method of making an emulsifier which comprises precipitating a boiling solution of aluminum salts by addition of an alkaline suspension of clay, the clay and aluminum salt being employed in proportions giving roughly equal proportions by weight of clay and precipitated alumina and sufficient alkaline material being present to precipitate the aluminum as a hydrated aluminum precipitate.

6. A method of making an emulsifier, which comprises preparing a dispersion of clay in water, preparing a boiling aqueous solution of aluminum sulphate and admixing said dispersion and solution with sufficient alkaline materials to precipitate the aluminum as a hydrated aluminum precipitate.

7. An emulsifier for forming a stable emulsion of water and a liquefiable material immiscible with water, consisting of the reaction product of an alkaline dispersion of clay in water and a boiling solution of an aluminum salt with sufficient alkaline material to precipitate alumina in the clay as a hydrated gelatinous precipitate, said emulsifier having been freed from dissolved electrolytes by washing, being a gelatinous plastic mass and having the characteristic of losing its emulsifying activity upon drying.

8. An emulsifier for forming a stable emulsion of water and a liquefiable material immiscible with water, consisting of the reaction product of an alkaline dispersion of clay in water and a boiling solution of an aluminum salt with sufficient alkaline material to precipitate alumina in the clay, said emulsifier being a gelatinous plastic mass with a pH value of approximately 5.8 and having the characteristic of losing its emulsifying activity upon drying.

9. An emulsifier for forming a stable emulsion of water and a liquefiable material immiscible with water, consisting of the reaction product of an alkaline dispersion of clay in water and a boiling solution of an aluminum salt with sufficient alkaline material to precipitate alumina in the clay, the proportion of hydrated alumina precipitate in the clay being greater than half the amount of clay, said emulsifier having been freed from dissolved electrolytes by washing and having the characteristic of losing its emulsifying activity upon drying.

10. An emulsifier for forming a stable emulsion of water and a liquefiable material immiscible with water, consisting of the reaction product of an alkaline dispersion of natural clay in water and a boiling solution of an aluminum salt with sufficient alkaline material to precipitate alumina in said clay as a hydrated gelatinous precipitate, said emulsifier having been freed from dissolved electrolytes by washing, being a gelatinous plastic mass and having the characteristic of losing its emulsifying activity upon drying.

11. An emulsifier according to claim 10, in which the clay is natural black clay.

12. An emulsifier according to claim 10, in which the clay is a natural china clay.

THOMAS ROBINSON.
CARLTON H. BASCOM.

REFERENCES CITED

The following references are of record in the file of this patent:

UNITED STATES PATENTS

| Number | Name | Date |
| --- | --- | --- |
| 1,733,494 | Kirschbraum | Oct. 29, 1929 |
| 2,080,359 | Lepsoe | May 11, 1937 |
| 2,099,351 | Smith | Nov. 16, 1937 |
| 2,194,218 | Dickeson | Mar. 19, 1940 |
| 2,327,882 | Gabriel | Aug. 24, 1943 |
| 2,374,313 | Veltman | Apr. 24, 1945 |
| 2,410,436 | Ewing | Nov. 5, 1946 |

OTHER REFERENCES

Page 426 of the book entitled "Emulsions and Foams," by Berkman and Egloff (1941).